US009542321B2

United States Patent
Wu et al.

(10) Patent No.: US 9,542,321 B2
(45) Date of Patent: Jan. 10, 2017

(54) SLICE-BASED RANDOM ACCESS BUFFER FOR DATA INTERLEAVING

(71) Applicant: LSI Corporation, San Jose, CA (US)

(72) Inventors: Zhiwei Wu, Shanghai (CN); Zhibin Li, Shanghai (CN); Kurt J. Worrell, Berthoud, CO (US); Joseph R. Robert, Bethlehem, PA (US); Feina Wen, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/260,463

(22) Filed: Apr. 24, 2014

(65) Prior Publication Data

US 2016/0034393 A1    Feb. 4, 2016

(51) Int. Cl.
 *G06F 9/38* (2006.01)
 *G06F 12/02* (2006.01)
 (Continued)

(52) U.S. Cl.
 CPC .......... *G06F 12/084* (2013.01); *G06F 3/0608* (2013.01); *G06F 3/0644* (2013.01); *G06F 3/0656* (2013.01);
 (Continued)

(58) Field of Classification Search
 CPC ...... G06F 3/061; G06F 3/0656; G06F 3/0658; G06F 2212/222; G06F 3/064; G06F 12/0871; G06F 2212/282; G06F 2212/7203; G06F 3/0679; G06F 13/16; G06F 3/0635; G06F 3/067; G06F 9/3885; G06F 12/0607; G06F 12/0802;G06F 12/0873; G06F 12/10; G06F 17/30312; G06F 2212/251; G06F 2212/70; G06F 3/0655; G06T 1/60; G06T 1/20; G11B 20/10527; G09G 2360/08; G09G 2360/122; G09G 5/397
 See application file for complete search history.

(56) References Cited

U.S. PATENT DOCUMENTS 8,151,035 B2      4/2012 Smith et al.
2007/0041050 A1*  2/2007 Wang ........................... 358/1.16
                         (Continued)

OTHER PUBLICATIONS

Matloff, "Memory Interleaving" University of California at Davis, Nov. 2003.
(Continued)

*Primary Examiner* — Dionne H Pendleton (57) ABSTRACT

The disclosure is directed to a system and method for interleaving data utilizing a random access buffer that includes a plurality of independently accessible memory slots. The random access buffer is configured to store slices of incoming data sectors in free memory slots, where a free memory slot is identified by a status flag associated with a logical address of the free memory slot. Meanwhile, a label buffer is configured to store labels associated with the slices of the incoming data sectors in a sequence based upon an interleaving scheme. Media sectors including the interleaved data slices are read out from the memory slots of the random access buffer in order of the sequence of labels stored by the label buffer. As the media sectors are read out of the random access buffer, the corresponding memory slots are freed up for incoming slices of the next super-sector.

20 Claims, 7 Drawing Sheets

(51) Int. Cl.
  *G06F 12/08* (2016.01)
  *G06F 3/06* (2006.01)
  *G11B 20/10* (2006.01)

(52) U.S. Cl.
  CPC ........... *G06F 3/0665* (2013.01); *G06F 3/0689* (2013.01); *G06F 3/061* (2013.01); *G06F 3/064* (2013.01); *G06F 12/0871* (2013.01); *G06F 2003/0691* (2013.01); *G06F 2003/0692* (2013.01); *G06F 2212/1044* (2013.01); *G06F 2212/152* (2013.01); *G06F 2212/165* (2013.01); *G06F 2212/21* (2013.01); *G06F 2212/222* (2013.01); *G06F 2212/224* (2013.01); *G06F 2212/251* (2013.01); *G06F 2212/262* (2013.01); *G06F 2212/281* (2013.01); *G06F 2212/282* (2013.01); *G06F 2212/312* (2013.01); *G06F 2212/462* (2013.01); *G06F 2212/6042* (2013.01); *G06F 2212/70* (2013.01); *G06F 2212/7203* (2013.01); *G11B 20/10527* (2013.01)

(56) References Cited

U.S. PATENT DOCUMENTS

| | | | |
|---|---|---|---|
| 2009/0216942 A1* | 8/2009 | Yen | 711/112 |
| 2009/0300234 A1* | 12/2009 | Haga | 710/56 |
| 2009/0319749 A1* | 12/2009 | Ogihara | G06F 3/061 |
| | | | 711/170 |
| 2012/0284482 A1* | 11/2012 | Sullender | 711/170 |
| 2014/0258591 A1* | 9/2014 | Dunn | 711/103 |
| 2014/0281146 A1* | 9/2014 | Horn | 711/103 |
| 2015/0046678 A1* | 2/2015 | Moloney | G09G 5/397 |
| | | | 712/29 |

OTHER PUBLICATIONS

Malema et al, "Interconnection network for structured low-density paritycheck decoders," Asia-Pacific Conference on Communications, Oct. 3-5, 2005, pp. 537-540.

Chen et al "Normalized Switch Schemes for Low Density Parity Check Codes," IMACS Multiconference on Computational Engineering in Systems Applications, Oct. 2006.

Tarabel et al "Further results on mapping functions," Information Theory Workshop, 2005 IEEE, vol., No., pp. 5, Aug. 29-Sep. 1, 2005.

Gunnam "Next Generation Iterative LDPC Solutions for Magnetic Recording Storage", Invited presentation at 42nd Asilomar Conference on Signals, Systems and Computers, Oct. 28.

Chaichanavong U.S. Appl. No. 60/830,045 Reduced-complexity decoding algorithm for non-binary LDPC codes, filed Jul. 2006.

Darabiha et al "Multi-Gbit/sec low density parity check decoders with reduced interconnect complexity," in Proc. IEEE International Symposium on Circuits and Systems 2005.

Vancourt et al "Application-Specific Memory Interleaving Enables High Performance in FPGA-based Grid Computations" FCCM 2006.

* cited by examiner

| SLOT 0   | SLOT 1   | ...... | ......   | SLOT 99  |
|----------|----------|--------|----------|----------|
| SLOT 100 | SLOT 101 | ...... | ......   | SLOT 199 |
| SLOT 200 | SLOT 201 | ...... | SLOT 239 |          |

| $S2L4^3$ | $S2L8^2$    | $S2L3^5$ | $S1L1^9$ | $S2L11^{14}$ | $S1L8^{10}$ | $S2L7^{12}$ | ...... |
|----------|-------------|----------|----------|--------------|-------------|-------------|--------|
| $S2L1^5$ | $S2L4^{13}$ | $S2L5^7$ | $S2L9^0$ | $S1L0^9$     | $S2L4^4$    | $S1L3^{14}$ | ...... |

204

T1

| $S2L4^3$ | $S2L8^2$    | $S2L3^5$ | $S1L1^9$ | $S2L11^{14}$ | $S1L8^{10}$ | $S2L7^{12}$ | ...... |
|----------|-------------|----------|----------|--------------|-------------|-------------|--------|
| $S2L1^5$ | $S2L4^{13}$ | $S2L5^7$ | $S2L9^0$ | $S3L0^0$     | $S2L4^4$    | $S1L3^{14}$ | ...... |

204

T2

| $S2L4^3$ | $S2L8^2$    | $S2L3^5$ | $S3L0^1$ | $S2L11^{14}$ | $S1L8^{10}$ | $S2L7^{12}$ | ...... |
|----------|-------------|----------|----------|--------------|-------------|-------------|--------|
| $S2L1^5$ | $S2L4^{13}$ | $S2L5^7$ | $S2L9^0$ | $S3L0^0$     | $S2L4^4$    | $S1L3^{14}$ | ...... |

SLICE-BASED RANDOM ACCESS BUFFER FOR DATA INTERLEAVING

FIELD OF INVENTION

The disclosure relates to interleaving data within a communication channel such as, but not limited to, a read or write channel of a hard disk drive.

BACKGROUND

By interleaving data sectors around a track it is possible average out sector-to-sector signal-to-noise ratio (SNR) variation, such that bad SNR (e.g. due to a media defect) can be spread across multiple media sectors. This lessens the impact on each individual data sector and improves overall SNR variation tolerance for a data storage device, such as a hard disk drive (HDD). Logical sectors are collected to form a new super-sector group, and then at the output, each media sector is formed from interleaved portions of the logical sectors, often referred to as slices. Each logical sector is divided into many slices and then distributed to nonadjacent places on the media to average out SNR. Because of the track length or due to grown media defect area, each super-sector group may contain a different number of logical sectors. For example, a super-sector may include from 1 to 16 logical sectors.

Maintaining a continuous data stream can be problematic because every media sector in a super-sector group includes a portion of each of the logical sectors. Until all media sectors in a super-sector are output, the next super-sector's logical sectors are not allowed to input, resulting in a gap between the super-sectors. One method of accounting for the discontinuity is to use a ping pong structure with dual super-sector buffers. A gapless output can be created using dual super-sector buffers, but memory size must be doubled (e.g. from 16 sectors to 32 sectors in size), resulting in increased silicon area cost.

SUMMARY

Various embodiments of the disclosure are directed to systems and methods for interleaving data utilizing a random access buffer that includes a plurality of independently accessible memory slots having unique logical addresses. In an embodiment, a system includes a slice divider, a random access buffer, and a label buffer. The slice divider is configured to receive incoming data sectors of a super-sector and further configured to divide the incoming data sectors into slices. The random access buffer is then configured to store the slices of the incoming data sectors in free memory slots, where a free memory slot is identified by a status flag associated with a logical address of the free memory slot. Meanwhile, the label buffer is configured to store labels associated with the slices of the incoming data sectors in a sequence based upon an interleaving scheme. A processor in communication with the random access buffer and the label buffer is configured to read out media sectors corresponding to the super-sector, where the media sectors include interleaved data slices read out from the memory slots of the random access buffer in order of the sequence of labels stored by the label buffer. As the media sectors are read out of the random access buffer, the corresponding memory slots are freed up for incoming slices of the next super-sector. Accordingly, a continuous (gapless) output stream can be created because the random access buffer is refilled with slices of the next super-sector as soon as current super-sector slices are read out (i.e. the buffers are updated on a slice-by-slice basis).

It is to be understood that both the foregoing general description and the following detailed description are not necessarily restrictive of the disclosure. The accompanying drawings, which are incorporated in and constitute a part of the specification, illustrate embodiments of the disclosure, wherein like numbers represent like characters.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings. FIGS. 1A through 5 illustrate various embodiments of a system and method for interleaving data utilizing a slice-based random access buffer to accommodate a dynamic range of super-sector sizes, sector lengths, and slice sizes. With the slice-based random access buffer and associated system architecture described herein, totally gapless output can be created with only one super-sector buffer (as opposed to dual alternating super-sector buffers). This is possible with only a slightly larger super-sector buffer and a label buffer for recording the slot of the random access buffer that is being written to. Despite the additions, the footprint and material cost remains less than the dual-buffer architecture.

Figure 1A:
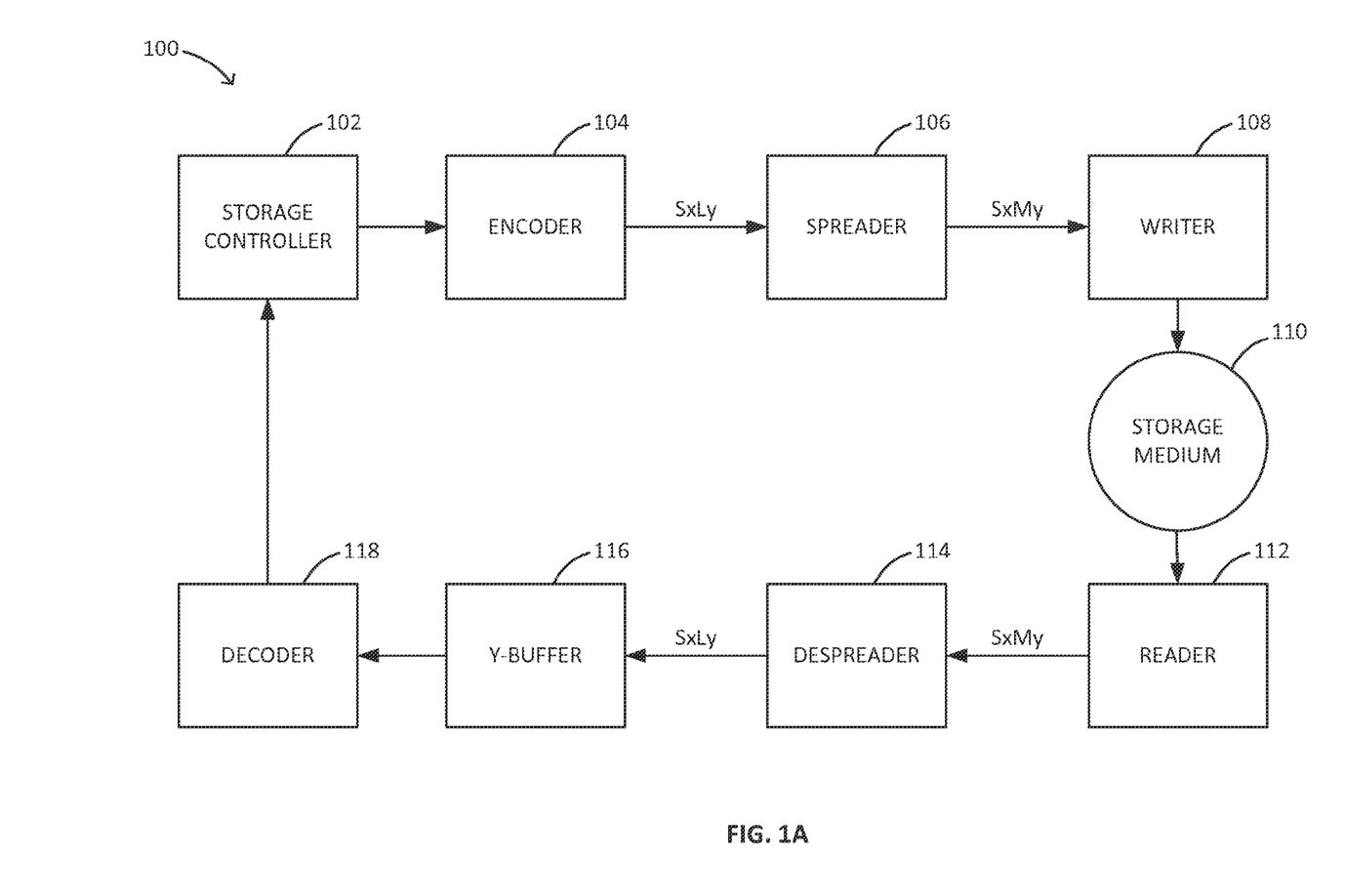
FIG. 1A is a block diagram illustrating a storage device, in accordance with an embodiment of the disclosure.

In FIG. 1A, a data storage device 100 is illustrated in accordance with an embodiment of the disclosure. The storage device 102 includes a storage controller 102 configured to store data sectors to a storage medium 110 (e.g. a magnetic platter) via a write path including an encoder 104, a spreader 106, and a writer 108. At the encoder block 104 (e.g. RLL encoder and/or LDPC encoder) the data sectors are encoded and then transferred to the spreader 106. In some embodiments, the logical sectors feed into the sector spreader 106 for interleaving; where after collecting enough logical sectors (e.g. all sectors of a super-sector group), media sectors corresponding to the input logical sectors of the super-sector group are output according to an interleaving scheme. The spreader 106 is configured to interleave the encoded data sectors and further configured to transfer the media sectors, which include the interleaved memory slices of the logical data sectors, to the writer 108 (e.g. a magnetic/optical recording head). The writer 108 is then configured to record the media sectors on the storage medium 110. When the storage controller 102 retrieves the data from the storage medium 110, a reader 112 (e.g. magnetic/optical read head) is configured to read the interleaved data from the storage medium 110 and is further configured to transfer the interleaved data through a read channel. In the read channel, a despreader 114 is configured to de-interleave the media sectors and output logical data sectors, which are then sent through a Y-buffer 116 to a decoder block 118 (e.g. LDPC decoder).

Figure 1B:
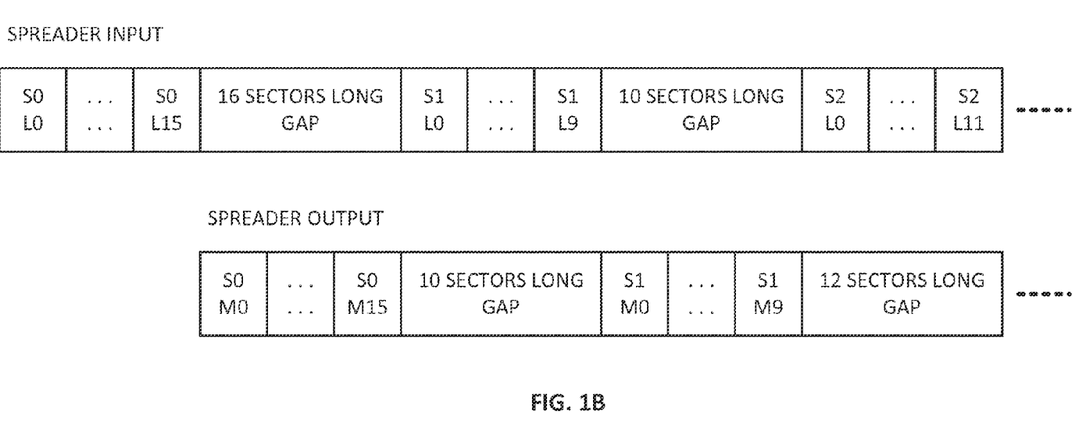
FIG. 1B is a block diagram illustrating spreader input and output data streams with gaps between super-sectors.
Figure 1C:
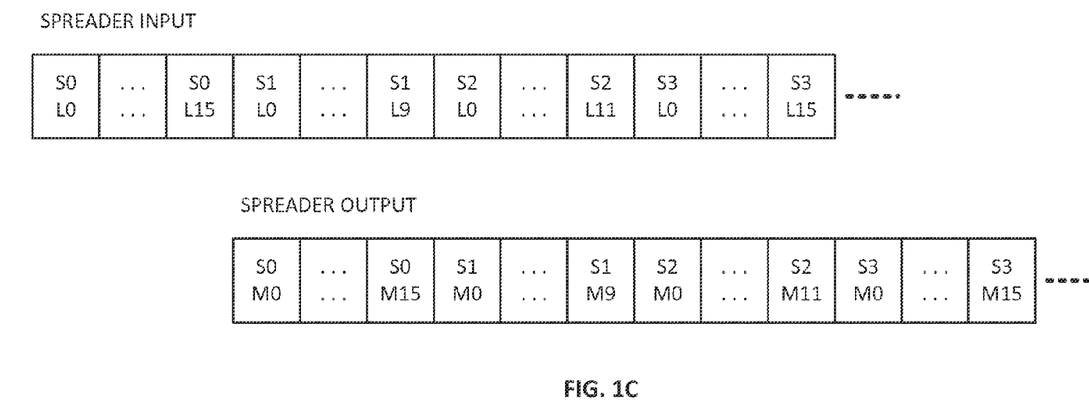
FIG. 1C is a block diagram illustrating spreader input and output data streams without gaps between super-sectors.

The write system requires a continuous data stream to the media in a track, which would be problematic in a typical single-buffer spreader architecture. For example, with 16x-10x-12x-16x super-sector groups, each sector being divided into 15 slices, the typical output is shown in FIG. 1B. With only 1 super-sector buffer that is at least 16 sectors wide, the input logical sectors (SxLy=super-sector x logical sector y) are stored in the buffer in sequence. Since each media sector (SxMy=super-sector x media sector y) in a super-sector group includes interleaved portions of the logical sectors making up the super-sector, the next super-sector's logical sectors are not allowed to input until all media sectors in the current super-sector are output. This results in gaps between the super-sectors. The input and output streams illustrated in FIG. 1C are continuous (gapless) streams, as desired. As mentioned above, one method of generating a continuous output stream is to utilize at least two alternating super-sector buffers (sometimes referred to as "ping pong" buffer architecture). Using the dual-buffer architecture, a gapless output could be created, but memory size would be doubled (e.g. from 16 sectors wide to 32 sectors wide), thereby significantly increasing silicon area cost.

Figure 2A:
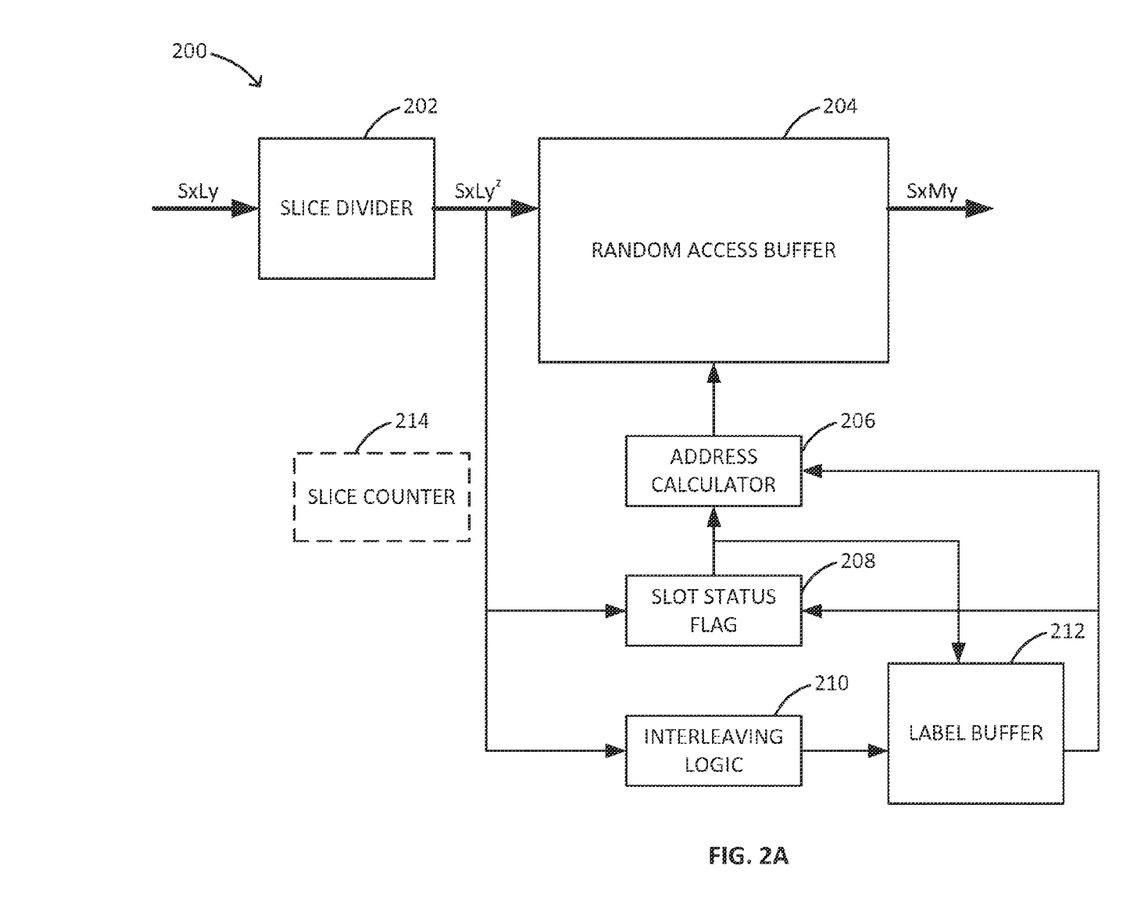
FIG. 2A is a block diagram illustrating a system for interleaving data, in accordance with an embodiment of the disclosure.

An interleaver system 200 illustrated in FIG. 2A is another approach to achieving continuous (gapless) output with less cost than the dual-buffer architecture that is commonly used. According to various embodiments of the system 200, one large random access buffer is internally divided into many slots which have unique labels. These slots are distinguished by buffer address and can be accessed out-of-order. Additionally, each slot has a status flag to indicate slot availability. The slots and respective statuses may be searched by label number order. The input logical sectors (SxLy) are divided into slices (SxLy$^z$=super-sector x logical sector y slice z) in advance. These slices can be allocated, independently, to any free slot. In some embodiments, the incoming slices are allocated to the slot which has smallest label number. Anytime a slice stored within a slot is read out in a media sector, the slot's status flag is reset to free so that it can receive the next incoming slice. When the random access buffer is read out, it is also updated at the same time (i.e. slots are emptied and refilled in parallel) so that the input and output streams are continuous.

In an embodiment, the system 200 includes a slice divider 202, a random access buffer 204, and a label buffer 212. The slice divider 202 is configured to receive incoming data sectors of a super-sector and further configured to divide the incoming data sectors into slices. The random access buffer 204 is then configured to store the slices of the incoming data sectors in free memory slots. In some embodiments, an address calculator 206 is configured to determine the logical block address of the slot for storing an incoming slice based upon a respective slot status flag 208. Meanwhile, the label buffer 212 is configured to store labels associated with the slices of the incoming data sectors in a sequence based upon an interleaving scheme, which may be programmed or embedded in interleaving logic 210. In some embodiments, the system 200 further includes a slice counter 214 configured to determine the beginning and end points of sectors or super-sector groups by counting the input/output slices.

Figure 2B:
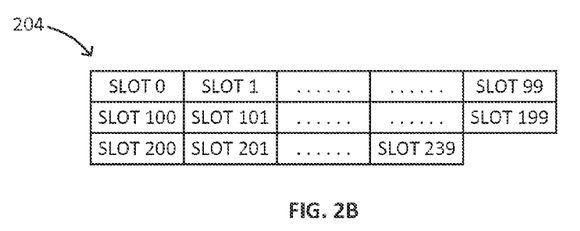
FIG. 2B is a block diagram illustrating a plurality of independently accessible slots of a random access buffer, in accordance with an embodiment of the disclosure.

As shown in FIG. 2B, the slots of the random access buffer 204 are written and read by label and are totally independent. In some embodiments, the slots are all the same size, for example, using the largest possible slice size if the sectors include differently sized slices. The random access buffer 204 includes at least enough slots to store all the data slices of the largest possible super-sector. For example, if the largest possible super-sector is 16 sectors wide and each sector includes up to 15 slices, the random access buffer will include at least 16×15=240 slots.

Figure 2C:
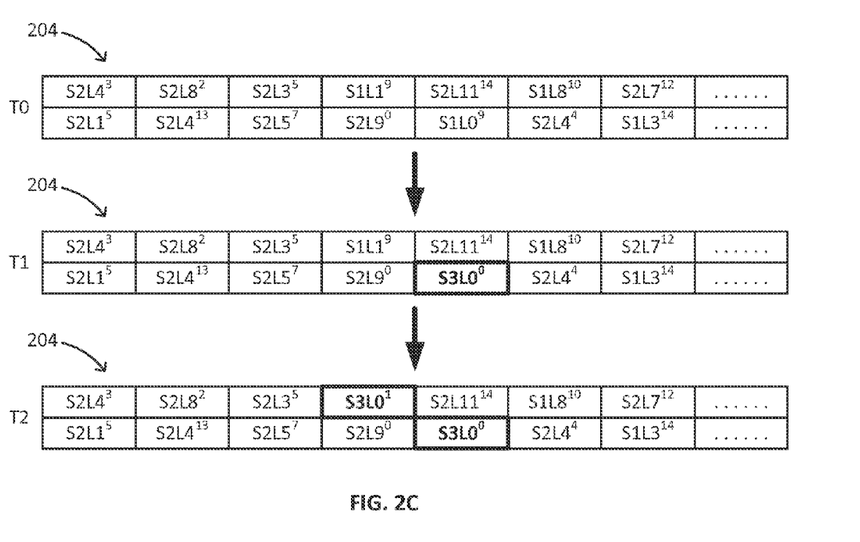
FIG. 2C is a block diagram illustrating a plurality of independently accessible slots of a random access buffer, wherein the memory slots are being read out and refilled with new data slices, in accordance with an embodiment of the disclosure.

The incoming slices of a logical sector can be distributed to any free slot, and the slices are read out according to the output sequence stored in the label buffer 212. The buffer updating happens all the time, as illustrated in FIG. 2C with buffer snapshots of incoming super-sector group S3 and outgoing super-sector S1. When enough logical sectors have been collected, media sectors corresponding to the current super-sector group are read out (e.g. by a processor that is in communication with the random access buffer and the label buffer), where the media sectors include interleaved data slices read out from the memory slots of the random access buffer 204 in order of the sequence of labels stored by the label buffer 212. It is noted herein that collecting "enough" sectors does not necessarily mean collecting all logical or media sectors of a super-sector group. In some embodiments, for example, media output can be started prior to receiving all logical sectors, and doing so can advantageously reduce the required memory size. Accordingly, "enough" logical or media sectors should be understood as generally referring to some predetermined, system-defined, or user-specified threshold number of sectors. In some embodiments, the media sector output can also be delayed as needed (e.g. by a predetermined time interval) to ensure gapless output in the face of variably sized super-sectors without any additional cost for overspeed capability. That is, overspeed operation, such as being able to read/write the label or data memories at two times the read/write rate, could be used to eliminate the gaps but only at the cost of additional area and power.

As the media sectors are read out, the corresponding memory slots of the random access buffer 204 are freed up for incoming slices of the next super-sector. As shown in the example illustrated in FIG. 2C, before incoming slices of logical sector S3L0 are stored, the slices in the buffer include four media sectors of super-sector S1 and twelve media sectors of super-sector S2. In some embodiments, the random access buffer 204 is configured to suspend outputting the first media sector (e.g. S1L0) of a super-sector group (e.g. S1) until all slots are full. For example, the random access buffer output may be suspended until 16 logical sectors are stored in the random access buffer 204, even if the first super-sector (e.g. S1) is only 4x, to make sure no gaps result between super-sectors once super-sector output has commenced.

Looking again to the example illustrated in FIG. 2C, as media sectors are output, which include the interleaved slices of super-sector S1, the corresponding slots are freed for the slices of super-sector S3. The incoming slices are written to the nonadjacent slots of the random access buffer 204. When data slice $S1L0^9$ (shown at T0) is read out, the respective status flag is reset to free, and the slot is refilled at T1 with the incoming slice $S3L0^0$ of the next super-sector group (e.g. super-sector S3). The random access buffer 204 keeps updating on a slice-by-slice basis. For example, at T2, the slot that is freed when slice $S1L1^9$ is read out is immediately refilled with the next slice $S3L0^1$. Accordingly, a continuous (gapless) output stream is created because the random access buffer 204 is refilled with slices of the next super-sector as soon as current super-sector slices are read out.

In contrast to the additional super-sector sized buffer required for the ping-pong scheme, here only one additional slice-sized buffer may be needed to maintain gapless output. For example, if the random access buffer includes memory slots capable of accommodating 240 slices, then the system 200 may include a slice buffer that is approximately $\frac{1}{240}^{th}$ the size of the random access buffer 204. It is further contemplated that with reduced latency, no additional slice buffer would be required. Once slices are output from slots of the random access buffer 204, the slots could be immediately filled in with incoming slices of the next sector. The write and read could happen at the same memory slot. However, a small (e.g. 1-slice or 2-slice sized) buffer will allow for simpler control logic. Accordingly, some embodiments of system 200 may further include a small slice buffer coupled to the random access buffer 204.

The interleaver system 200 may be incorporated into a transmitting portion of a communication channel. In some embodiments, the interleaver system 200 is included in the spreader 106 of the write path of a data storage device 100 (FIG. 1). Accordingly, some of the functions, operations, or steps described above may be executed by the storage controller 102 or any other processor or control unit included in or communicatively coupled with the data storage device 100. In addition, a similarly structured de-interleaver system may be incorporated into a receiving end of the communication channel or network, such as in the despreader 114 of the read path of the data storage device 100.

In an embodiment, a de-interleaver system includes components similar to those of the interleaver system 200 with the following differences. The slice divider 202 is instead configured to receive incoming media sectors and further configured to divide the incoming media sectors into slices. The random access buffer 204 is instead configured to store the slices of the incoming media sectors in the free memory slots, and the label buffer configured to store labels associated with the slices of the incoming media sectors in a sequence based upon a de-interleaving scheme. The de-interleaving scheme is programmed or embedded in de-interleaving logic (in place of the interleaving logic 210) and is based on the interleaving scheme of the interleaver system 200 (e.g. the reverse of the interleaving scheme). When enough sectors are collected, logical data sectors (i.e. the de-interleaved memory slices) belonging to a super-sector group are read out from the memory slots of the random access buffer 204 in order of the sequence of labels stored by the label buffer 212. It is contemplated that additional modifications may be necessary or desirable for re-structuring system 200 as a de-interleaver system, and that those skilled in the art will readily appreciate the ability to make such modifications without departing from the scope of this disclosure.

Figure 3:
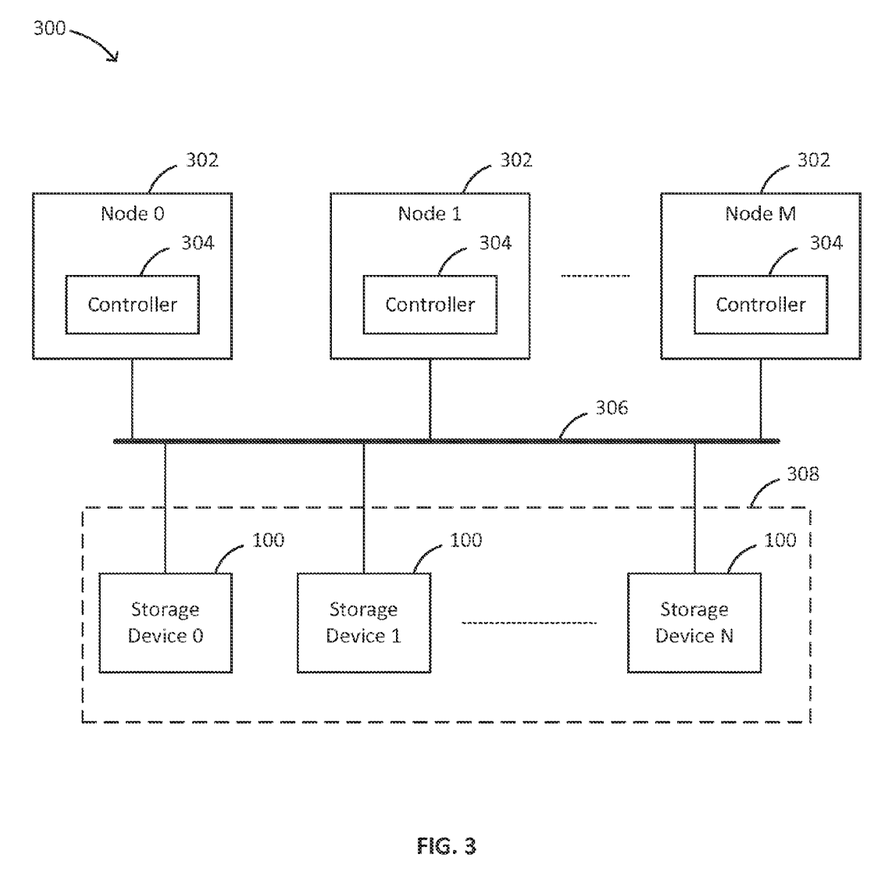
FIG. 3 is a block diagram illustrating a storage system including a cluster of storage devices, in accordance with an embodiment of the disclosure.

Some data storage systems include a plurality of storage devices. For example, redundant array of independent disk or device (RAID) configurations can include N storage devices such as, but not limited to, hard-disk drives, solid-state drives, or a combination thereof, where N is any number greater than 1. FIG. 3 illustrates and embodiment of a data storage system 300 including a RAID configuration where the N devices making up a storage cluster 308 include one or more data storage devices 100 having a spreader block 106 (interleaver system 200) and/or despreader block 114 (de-interleaver system) with architectures as described above. The data storage system 300 further includes one or more nodes 302 or servers, each including a respective controller 304. The controller 304 in each of the one or more nodes 302 may include a RAID-on-Chip (ROC) controller, a processor, or any other controller configured to access some or all of the N devices via a network 306, such as one or more switches or expanders, directly or indirectly linking each controller 304 to the one or more storage devices 100 of the storage cluster 306.

Figure 4:
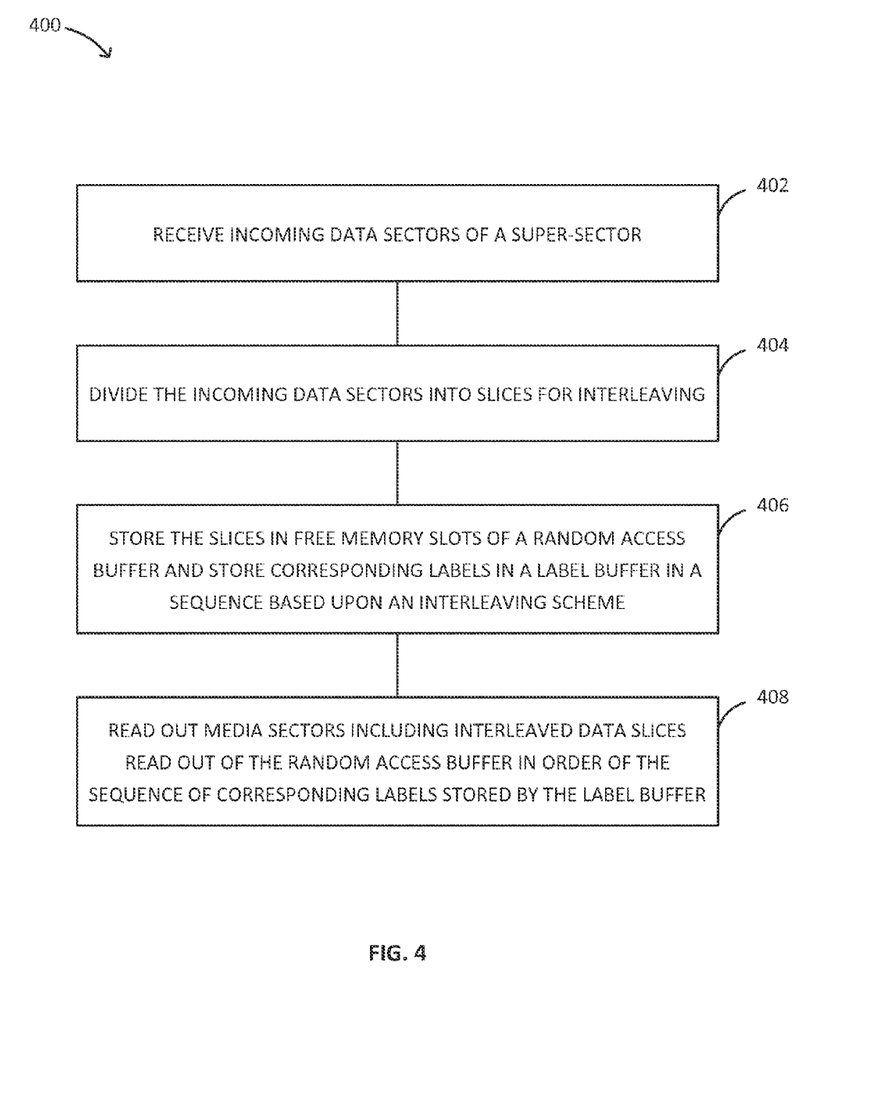
FIG. 4 is a flow diagram illustrating a method of interleaving data, in accordance with an embodiment of the disclosure.
Figure 5:
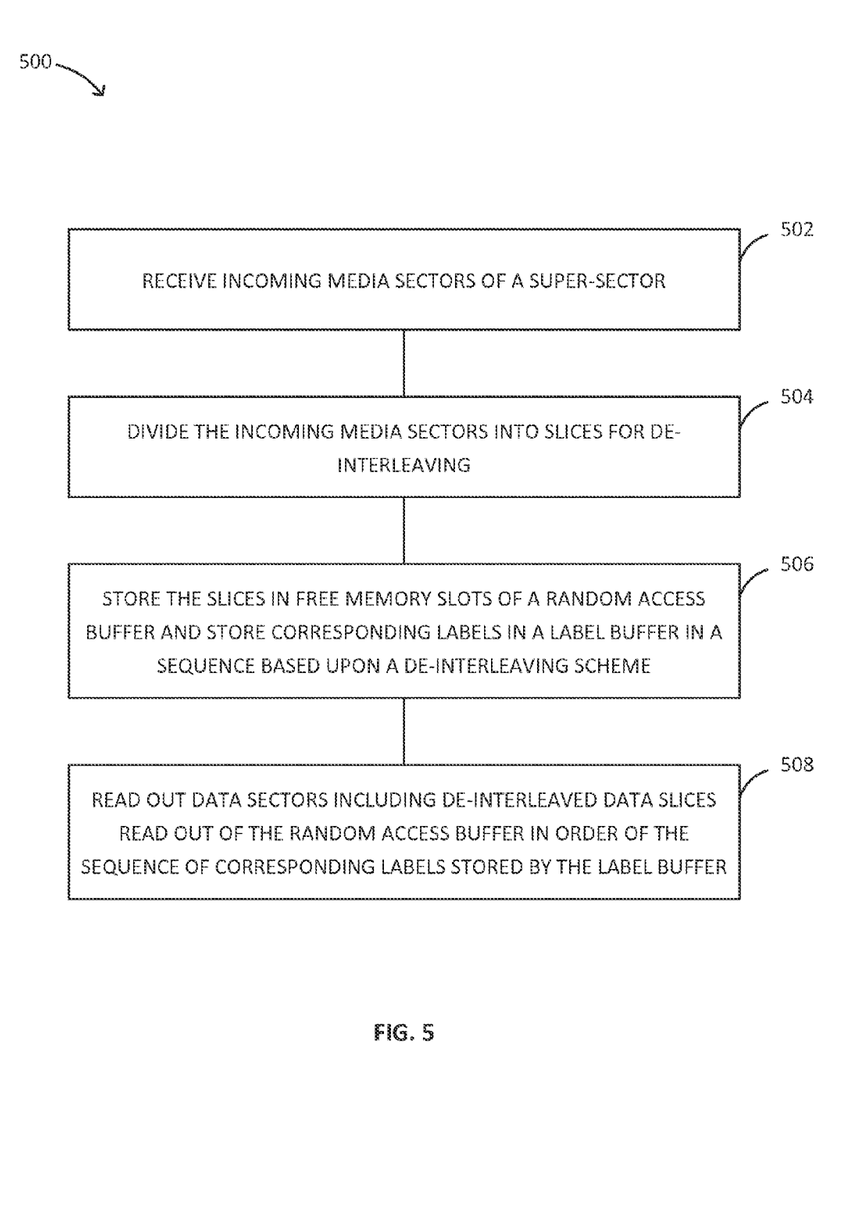
FIG. 5 is a flow diagram illustrating a method of de-interleaving data, in accordance with an embodiment of the disclosure.

FIGS. 4 and 5 illustrate a method 400 of interleaving data and a method 500 of de-interleaving data, respectively. In some embodiments, computer-readable program instructions implementing the steps of method 400 or method 500 executed by at least one processor from a communicatively coupled carrier medium or carried out via any other hardware, firmware, or software such as, but not limited to, dedicated electronic circuitry, a programmable logic device, an application-specific integrated circuit (ASIC), a controller/microcontroller, a computing system and/or processor, or any combination thereof. Those skilled in the art will further appreciate that methods 400 and 500 are not restricted to the embodiments of the interleaver system 200 and similarly structured de-interleaver system, which are described above, and can be alternatively manifested by any combination of systems and devices configured to carry out the following steps.

Looking now to FIG. 4, a method 400 of interleaving data is illustrated according to an embodiment of the disclosure. At step 402, incoming logical data sectors belonging to a super-sector are received, and at step 404, the incoming sectors are divided into slices for interleaving. At step 406, the slices are stored in free (possibly non-adjacent) memory slots of a random access buffer, and corresponding labels are stored in a label buffer in a sequence based upon an interleaving scheme. When enough data slices have been received, such as when all slices of the super-sector group are received or the memory slots are all filled, the method 400 proceeds to step 408. At step 408, media sectors including interleaved data slices are read out from the random access buffer in order of the sequence of corresponding labels stored by the label buffer (i.e. according to the interleaving scheme). As the media sectors are read out, the corresponding slot status flags are reset to free so that incoming slices of the next super-sector group can be allocated to the emptied slots. The label buffer is continually updated as well.

In FIG. 5, a method 500 of de-interleaving data is illustrated according to an embodiment of the disclosure. As can be seen, the method 500 is based on similar principles as method 400. At step 502, incoming media sectors belonging to a super-sector are received, and at step 504, the incoming media sectors are divided into slices for de-interleaving. At step 506, the slices are stored in free (possibly non-adjacent) memory slots of a random access buffer, and corresponding labels are stored in a label buffer in a sequence based upon a de-interleaving scheme, which is at least partially based upon the interleaving scheme of method 400 (e.g. a reverse of the interleaving scheme). When enough data slices have been received, such as when all slices of the super-sector group are received or the memory slots are all filled, the method 500 proceeds to step 508. At step 508, logical data sectors including de-interleaved (i.e. logically ordered) data slices are read out from the random access buffer in order of the sequence of corresponding labels stored by the label buffer (i.e. according to the de-interleaving scheme). As the logical sectors are read out, the corresponding slot status flags are reset to free so that incoming slices of the next super-sector group can be allocated to the emptied slots. The label buffer is continually updated as well.

The data interleaving or de-interleaving architectures and associated methods described in the embodiments provided above are suitable for a variety of applications due to characteristics including, but not limited to: capability of achieving zero-stitch effect; ability to accommodate any number of sectors in a super-sector group, dynamically; and ability to accommodate any number of slices in sector; ability to accommodate any sector size (e.g. 4k, 8k, etc.) and differently sized slices in a sector. Moreover, because the label buffer is completely independent from the slicing, different slicing schemes can be implemented for different media zones, which may have different RLL algorithms. The architecture is very suitable for cold storage system with single write, multi-pass read. Using the architecture in the write path increases bandwidth. Because the read path does not have the same bandwidth requirement (i.e. gaps can be tolerated), a simple super-sector buffer can be used in the despreader block, thus resulting in significant area and power savings.

It should be recognized that the various functions, operations, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be implemented, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for interleaving data, comprising:
   a slice divider configured to receive incoming data sectors of a super-sector,
     the slice divider being further configured to divide the incoming data sectors into slices;
   a random access buffer including memory slots for storing data sector slices, the random access buffer being configured to store the slices of the incoming data sectors in free memory slots, wherein a free memory slot is identified by a status flag associated with a logical address of the free memory slot;
   a label buffer configured to store labels associated with the slices of the incoming data sectors in a sequence based upon an interleaving scheme; and
   a processor in communication with the random access buffer and the label buffer, the processor being configured to read out media sectors corresponding to the super-sector, wherein a media sector includes interleaved data slices read out from the memory slots of the random access buffer in order of the sequence of labels stored by the label buffer.

2. The system of claim 1, wherein the processor is configured to read out the media sectors corresponding to the super-sector after determining that the memory slots of the random access buffer for storing the data sector slices have been filled.

3. The system of claim 1, wherein the memory slots of the random access buffer for storing the data sector slices include at least enough memory slots to store each slice of each sector of a super-sector including a pre-determined largest possible number of sectors.

4. The system of claim 1, wherein the memory slots of the random access buffer for storing the data sector slices are the same size.

5. The system of claim 1, wherein each of the memory slots of the random access buffer for storing the data sector slices is at least as large as a pre-determined largest possible slice of a data sector.

6. The system of claim 5, wherein each of the memory slots of the random access buffer for storing the data sector slices is configured for receiving differently sized slices of a logical sector.

7. The system of claim 1, wherein the interleaving scheme is programmable.

8. The system of claim 1, wherein the processor is further configured to read out the media sectors corresponding to the super-sector after a predetermined delay period to ensure gapless output when variably sized super-sectors are being processed.

9. A method of interleaving data, comprising:
   receiving incoming data sectors of a super-sector;
   dividing the incoming data sectors into slices;
   storing the slices of the incoming data sectors in free memory slots of a plurality of independently accessible memory slots, wherein a free memory slot is identified by a status flag associated with a logical address of the free memory slot;
   storing labels associated with the slices of the incoming data sectors in a sequence based upon an interleaving scheme; and
   reading out media sectors corresponding to the super-sector, wherein a media sector includes interleaved data slices read out from the plurality of independently accessible memory slots in order of the sequence of stored labels.

10. The method of claim 9, wherein the media sectors corresponding to the super-sector are read out after determining that the independently accessible memory slots for storing data sector slices have been filled.

11. The method of claim 9, wherein the media sectors corresponding to the super-sector are read out after a pre-determined delay period to ensure gapless output when variably sized super-sectors are being processed.

12. The method of claim 9, wherein the independently accessible memory slots for storing data sector slices include at least enough memory slots to store each slice of each sector of a super-sector including a pre-determined largest possible number of sectors.

13. The method of claim 9, wherein the independently accessible memory slots for storing data sector slices are the same size.

14. The method of claim 9, wherein each of the independently accessible memory slots for storing data sector slices is at least as large as a pre-determined largest possible slice of a data sector.

15. The method of claim 14, wherein each of the independently accessible memory slots for storing data sector slices is configured for receiving differently sized slices of a logical sector.

16. A storage device, comprising:
a storage medium; and
a storage controller, the storage controller being configured to transfer data to the storage medium via a write channel, the write channel including:
a slice divider configured to receive incoming data sectors of a super-sector being written to the storage medium, the slice divider being further configured to divide the incoming data sectors into slices;
a random access buffer including memory slots for storing data sector slices, the random access buffer being configured to store the slices of the incoming data sectors in free memory slots, wherein a free memory slot is identified by a status flag associated with a logical address of the free memory slot; and
a label buffer configured to store labels associated with the slices of the incoming data sectors in a sequence based upon an interleaving scheme, the storage controller being in communication with the random access buffer and the label buffer, the storage controller being configured to transfer media sectors corresponding to the super-sector to the storage medium, wherein a media sector includes interleaved data slices read out from the memory slots of the random access buffer in order of the sequence of labels stored by the label buffer.

17. The storage device of claim 16, wherein the memory slots of the random access buffer for storing the data sector slices include at least enough memory slots to store each slice of each sector of a super-sector including a pre-determined largest possible number of sectors.

18. The storage device of claim 16, wherein each of the memory slots of the random access buffer for storing the data sector slices is at least as large as a pre-determined largest possible slice of a data sector.

19. The storage device of claim 16, wherein the storage controller is further configured to retrieve data from the storage medium via a read channel, the read channel including:
a slice divider configured to receive incoming media sectors of a super-sector being read from the storage medium, the slice divider being further configured to divide the incoming media sectors into slices;
a random access buffer including memory slots for storing media sector slices, the random access buffer being configured to store the slices of the incoming media sectors in free memory slots, wherein a free memory slot is identified by a status flag associated with a logical address of the free memory slot; and
a label buffer configured to store labels associated with the slices of the incoming media sectors in a sequence based upon a de-interleaving scheme, the de-interleaving scheme being based upon the interleaving scheme of the write channel, the storage controller being configured to read out data sectors of the super-sector being read from the storage medium, wherein a data sector includes de-interleaved data slices read out from the memory slots of the random access buffer in order of the sequence of labels stored by the label buffer.

20. The storage device of claim 16, wherein the storage controller is further configured to receive instructions from a redundant array of independent disks (RAID) controller, the RAID controller being in further communication with a plurality of storage devices included with the storage device in a RAID storage cluster.

* * * * *